United States Patent [19]

Miyagawa et al.

[11] Patent Number: 5,912,079
[45] Date of Patent: Jun. 15, 1999

[54] TREATING AGENT FOR BONDING, TREATED POLYESTER FIBER, ELASTIC BODY AND PROCESSES FOR THEIR PRODUCTION

[75] Inventors: Yasumichi Miyagawa, Hikari; Kenji Kuwata, Shinnanyo, both of Japan

[73] Assignee: Tosoh Corporation, Shinnanyo, Japan

[21] Appl. No.: 08/992,458

[22] Filed: Dec. 17, 1997

Related U.S. Application Data

[62] Division of application No. 08/815,578, Mar. 12, 1997, Pat. No. 5,766,762, which is a continuation of application No. 08/545,273, Oct. 19, 1995, abandoned.

[30] Foreign Application Priority Data

Nov. 4, 1994 [JP] Japan ................................. 6-271371

[51] Int. Cl.$^6$ ............................. D02G 3/00; C08K 3/200; B05D 1/36
[52] U.S. Cl. .......................... 428/375; 428/395; 524/510; 427/407.1; 427/412; 427/412.5; 427/410
[58] Field of Search ..................................... 428/375, 395; 524/510, 511; 427/412.5, 412, 410, 407.1

[56] References Cited

U.S. PATENT DOCUMENTS

| | | | |
|---|---|---|---|
| 5,200,455 | 4/1993 | Warren . | |
| 5,306,369 | 4/1994 | Fujiwara et al. | 156/110.1 |
| 5,496,884 | 3/1996 | Weih et al. . | |
| 5,626,953 | 5/1997 | Fujimoto | 428/296.4 |
| 5,691,415 | 11/1997 | Miyagawa et al. | 525/107 |

*Primary Examiner*—Newton Edwards
*Attorney, Agent, or Firm*—Oblon, Spivak, McClelland, Maier & Neustadt, P.C.

[57] ABSTRACT

A treating agent for bonding a polyester fiber and a chlorosulfonated polyolefin compound, which consists of a resorcinol/formaldehyde/latex mixture, wherein:

1) the molar ratio of the resorcinol to the formaldehyde is from 1/0.1 to 1/5, 2) the polymer component of the latex is a 2,3-dichlorobutadiene-containing polymer, 3) the weight ratio of the solid content of the latex to the sum of the resorcinol and the formaldehyde is from 1/100 to 1/1, 4) the amount of the 2,3-dichlorobutadiene-containing polymer solid content of the latex in the resorcinol/formaldehyde/latex mixture is from 5 to 50 wt %, and 5) the amount of a surfactant in the resorcinol/formaldehyde/latex mixture is from 0.5 to 2.5 wt %.

12 Claims, No Drawings

TREATING AGENT FOR BONDING, TREATED POLYESTER FIBER, ELASTIC BODY AND PROCESSES FOR THEIR PRODUCTION

This application is a division of application Ser. No. 08/815,578, filed on Mar. 12, 1997 now U.S. Pat. No. 5,766,762, which is a continuation of application Ser. No. 08/545,273, filed on Oct. 19, 1995, abandoned.

The present invention relates to a treating agent for a polyester fiber, a polyester fiber treated by the treating agent, an elastic body containing the treated polyester fiber and processes for their production. More particularly, it relates to a treating agent for bonding a chlorosulfonated polyolefin compound and a polyester fiber, whereby an improvement in the curing and bonding properties of a chlorosulfonated polyolefin compound and a treated polyester fiber can be accomplished by a simple treating method, a treated polyester fiber for reinforcing chlorosulfonated polyolefin, treated by such a treating agent, an elastic body made of a chlorosulfonated polyolefin compound cured and bonded with such a treated polyester fiber, and processes for their production.

In general, rubber is used in the form of a composite with a fiber in many cases. For example, an automobile part or an industrial part, such as a tire, a belt, a hose, or an air spring, is used in the form of a composite reinforced by a fiber.

The bonding property between the rubber and the fiber is an important factor for the performance of the composite. Especially in the case of a composite to be used in a dynamic field such as a tire, a belt or an air spring, firm bonding between the rubber and the fiber is required as compared with a composite to be used in a static field such a hose or a sheet.

As a method for firmly bonding such rubber and a fiber, a method has been widely employed in which the fiber is treated with a resorcinol/formaldehyde/latex mixture (hereinafter referred to as RFL).

On the other hand, a chlorosulfonated polyolefin has been regarded as a rubber which is hardly bonded to a fiber, among various rubbers. Further, it has been difficult to bond a chlorosulfonated polyolefin to a polyester fiber which is particularly poor in the bonding property to rubber.

To solve the above problem, Japanese Unexamined Patent Publication No. 125200/1993 proposes a method for firmly bonding a chlorosulfonated polyolefin and a polyester fiber, which comprises curing and bonding to a chlorosulfonated polyolefin compound a polyester fiber treated with a treating agent comprising an isocyanate compound and/or an epoxy compound and with RFL wherein the polymer component of the latex is a 2,3-dichlorobutadiene-containing polymer.

However, the above method for bonding the chlorosulfonated polyolefin compound and the polyester fiber, has had a problem such that when the polyester fiber pre-treated with the treating agent comprising an isocyanate compound and/or an epoxy compound, is dip-treated with RFL wherein the polymer component of the latex is a 2,3-dichlorobutadiene-containing polymer, there has been a fluctuation in the bond strength between the chlorosulfonated polyolefin compound and the polyester fiber depending upon the method for the dip-treatment. Such a problem has be likely to occur when fiber treatment is carried out continuously in a short period of time by means of a commonly employed fiber treating apparatus in a fiber treating step. This fluctuation may be prevented by repeating the step of coating the treating agent on the polyester fiber, but such will make the process for fiber treatment cumbersome and has been practically a serious problem.

The present invention has been made in view of the above problem, and it is an object of the present invention to provide a treating agent for bonding a chlorosulfonated polyolefin compound and a polyester fiber, which can be coated on a polyester fiber by a simple treating method, when the chlorosulfonated polyolefin compound and the treated polyester fiber are to be firmly bonded to each other, a treated polyester fiber for reinforcing chlorosulfonated polyolefin, consisting of a polyester fiber coated with such a treating agent, and an elastic body wherein the treated polyester fiber and a chlorosulfonated polyolefin compound are firmly bonded without a fluctuation in the bond strength.

The present inventors have made extensive studies on the above-mentioned technical problem and as a result, have found that a treating agent of the present invention as defined below can be coated by a simple treating method on a polyester fiber pre-treated with a treating agent comprising an isocyanate compound and/or an epoxy compound, and by curing and bonding the treated polyester fiber thus obtained and a chlorosulfonated polyolefin, it is possible to obtain an elastic body wherein the chlorosulfonated polyolefin compound and the treated polyester fiber are firmly bonded without a fluctuation in the bond strength. The present invention has been accomplished on the basis of these discoveries.

The present invention provides a treating agent for bonding a polyester fiber and a chlorosulfonated polyolefin compound, which consists of RFL, wherein:

1) the molar ratio of the resorcinol to the formaldehyde is from 1/0.1 to 1/5,
2) the polymer component of the latex is a 2,3-dichlorobutadiene-containing polymer,
3) the weight ratio of the solid content of the latex to the sum of the resorcinol and the formaldehyde is from 1/100 to 1/1,
4) the amount of the 2,3-dichlorobutadiene-containing polymer solid content of the latex in the RFL is from 5 to 50 wt %, and
5) the amount of a surfactant in the RFL is from 0.5 to 2.5 wt %.

The present invention also provides a method for preparing such a treating agent, which comprises adding resorcinol and formaldehyde to an aqueous sodium hydroxide solution, followed by aging to obtain a resorcinol/formaldehyde mixture, and mixing to the resorcinol/formaldehyde mixture a latex component obtained by adding a surfactant in an amount corresponding to from 0.8 to 2.5 wt % based on the weight of the RFL, during the polymerization of the polymer component of the latex.

The present invention provides a further method for preparing such a treating agent which comprises adding resorcinol and formaldehyde to an aqueous sodium hydroxide solution, followed by aging to obtain a resorcinol/formaldehyde mixture, and adding a latex to the resorcinol/formaldehyde mixture to obtain RFL, wherein a surfactant is added in a divided fashion firstly during the polymerization of the polymer component of the latex, and subsequently to the latex component after the polymerization and/or after the preparation of the RFL.

Further, the present invention provides a treated polyester fiber for reinforcing chlorosulfonated polyolefin, which consists of a polyester fiber coated with a treating agent comprising an isocyanate compound and/or an epoxy compound and with the treating agent of the present invention as defined above.

Furthermore, the present invention provides a process for producing such a treated polyester fiber for reinforcing chlorosulfonated polyolefin, which comprises treating a polyester fiber with a treating agent comprising an isocyanate compound and/or an epoxy compound and then with the treating agent of the present invention as defined above.

Still further, the present invention provides an elastic body comprising the above-mentioned treated polyester fiber and a chlorosulfonated polyolefin compound.

Further, the present invention provides a process for producing such an elastic body, which comprises laminating and/or mixing a chlorosulfonated polyolefin compound and the above-mentioned treated polyester fiber.

Now, the present invention will be described in detail with reference to the preferred embodiments.

RFL useful for the present invention is not particularly limited, so long as it contains resorcinol, formaldehyde, a latex and a surfactant as main components, and it may further contain sodium hydroxide, water, etc.

RFL is an aqueous solution which is obtainable by adding resorcinol and formaldehyde to an aqueous sodium hydroxide solution to conduct the reaction of both, and then adding a latex thereto.

In RFL of the present invention, the molar ratio of the resorcinol to formaldehyde is from 1/0.1 to 1/5 in order to obtain an adequate bond strength, and it is preferably within a range of from 1/0.1 to 1/3 in order to obtain a better bond strength. The weight ratio of the solid content of the latex to the sum of the resorcinol and the formaldehyde is from 1/100 to 1/1 in order to obtain an adequate bond strength, and it is preferably within a range of from 1/100 to 1/1.5 to obtain a better bond strength. Further, the amount of the solid content of the latex in RFL is from 5 to 50 wt % in order to obtain an adequate bond strength, and it is preferably within a range of from 10 to 50 wt % to obtain a better bond strength.

The latex component of RFL in the present invention is a 2,3-dichlorobutadiene-containing polymer. The reason for using a 2,3-dichlorobutadiene-containing polymer latex is that a 2,3-dichlorobutadiene-containing polymer component is essential for curing and bonding the polyester fiber and the chlorosulfonated polyolefin.

Here, the 2,3-dichlorobutadiene-containing polymer latex is a latex of a polymer having 2,3-dichloro-1,3-butadiene as monomer units, and it can be obtained by a conventional emulsion polymerization. Further, for the 2,3-dichlorobutadiene-containing polymer latex, it is possible to use a copolymer of 2,3-dichloro-1,3-butadiene with another monomer copolymerizable therewith, as the case requires. As such a copolymerizable monomer, ethylene, propylene, chloroprene, butadiene, isoprene, vinyl chloride, vinylidene chloride, vinyl acetate, styrene, acrylonitrile, maleic anhydride, an acrylic acid ester or a methacrylic acid ester may, for example, be mentioned. Such copolymerizable monomers may be used alone or in combination as a mixture of two or more of them.

Further, the 2,3-dichlorobutadiene-containing polymer latex may be used in the form of a latex mixture of the above polymer latex with one or more latexes selected from the group consisting of natural rubber latex, chloroprene rubber latex, styrene/butadiene rubber latex, acrylonitrile/butadiene rubber latex, chlorosulfonated polystyrene latex and styrene/butadiene/vinyl pyridine terpolymer latex, as the case requires.

The surfactant to be used for RFL in the present invention is not particularly limited so long as it is an anionic surfactant, a nonionic surfactant or a mixture of an anionic surfactant and a nonionic surfactant.

The anionic surfactant may, for example, be a resin acid soap such as rosin soap or disproportionated rosin soap, an alkyl sulfate such as sodium lauryl sulfate, an alkyl benzene sulfonate such as sodium dodecylbenzene sulfonate, an alkyl naphthalene sulfonate, a dialkyl sulfosuccinate, a polyoxyethylenealkyl ether sulfate, or a formalin condensation product of an alkyl aryl sulfonate, such as a formalin condensation product of a β-naphthalene sulfonate.

On the other hand, the nonionic surfactant may, for example, be a polyoxyethylene alkyl ether such as polyoxyethylene lauryl ether, a polyoxyethylene higher alcohol ether or a polyoxyethylene alkylphenyl ether such as polyoxyethylene nonylphenyl ether.

In the case of a mixture of an anionic surfactant and a nonionic surfactant, the above-mentioned anionic surfactant and nonionic surfactant may be mixed, and in such a case, the mixing ratio is not particularly limited.

The amount of the surfactant in RFL is from 0.5 to 2.5 wt %, based on 100 wt % of RFL, and it is preferably from 0.8 to 2.5 wt %, so that the coating on the polyester fiber can be made more uniformly. If the amount of the surfactant is less than 0.5 wt %, the stability of the latex component of RFL tends to be poor, and there will be a fluctuation in the bond strength between the chlorosulfonated polyolefin compound and the treated polyester fiber. On the other hand, if the amount of the surfactant exceeds 2.5 wt %, there will be an adverse effect to the bonding between the chlorosulfonated polyolefin compound and the treated polyester fiber, and the cost increases, such being not desirable also from the economical viewpoint.

The method of adding the surfactant during the process for producing RFL, may, for example, be 1) a method wherein the surfactant is added all at once at the time of preparing the latex for RFL, or 2) a method wherein the surfactant is added in a divided fashion firstly during the preparation of the latex component for RFL in such an amount that the latex can be obtained under a stable condition without precipitation of the solid content, and subsequently to the latex component after the preparation and/or after the preparation of RFL. However, the method for addition of the surfactant is not particularly limited to such specific embodiments.

In the method of adding the surfactant all at once at the time of preparing the latex for RFL, the amount of the surfactant to be added, is an amount corresponding to from 0.8 to 2.5 wt %, based on the weight of RFL. If the amount is less than the amount corresponding to 0.8 wt %, the stability of the latex component for RFL tends to be poor, and there will be a fluctuation in the bond strength between the chlorosulfonated polyolefin compound and the treated polyester fiber.

On the other hand, in the method of adding the surfactant in a divided fashion as mentioned above, the total amount of the surfactant added during the preparation of the latex and subsequently thereafter is an amount corresponding to from, 0.5 to 2.5 wt %, based on the weight of RFL. The amount of the surfactant to be added during the preparation of the latex component for RFL is not particularly limited and may be an amount smaller than the amount corresponding to 0.5 wt %, based on the weight of RFL, so long as it is an amount whereby a latex can be obtained under a stable condition without precipitation of the solid content.

In the present invention, the treated polyester fiber for reinforcing chlorosulfonated polyolefin is a fiber for reinforcing chlorosulfonated polyolefin which is obtained by treating a polyester fiber as the base material with a treating agent comprising an isocyanate compound and/or an epoxy compound and with the above described treating agent for bonding of the present invention. The treating method is not particularly limited and may, for example, be a method in which a polyester fiber is treated by the treating agent having an isocyanate compound and/or an epoxy compound and then with the treating agent for bonding of the present invention. More specifically, the fiber may be dipped in the respective treating agents, followed by drying and baking at a temperature of from 130 to 200° C. for from 1 to 10 minutes, and if necessary, it may further be subjected to heat setting or hot stretching at a temperature of from 150 to 230° C. for one to 10 minutes. A feature of the present invention is that the dipping treatment in RFL can be carried out by a single simple dipping treatment, whereby the treated polyester fiber can be firmly bonded by curing to the chlorosulfonated polyolefin compound.

Here, the polyester fiber, may for example, be a polystyrene terephthalate fiber, a polystyrene terephthalate/isophthalate fiber, a terephthalic acid/p-oxybenzoic acid/ethylene glycol copolymer fiber or a methoxy polyethylene glycol/pentaerythritol/ethylene terephthalate copolymer fiber, and it may be used in a various forms, for example, in the form of a code, a woven fabric, a non-woven fabric, a sheet, a film or a short fiber.

The isocyanate compound in the above pre-treatment is not particularly limited and may, for example, be phenyl methane triisocyanate, phenylthiophosphate isocyanate, tolylene diisocyanate or polymethylene polyphenylpolyisocyanate. Further, a polyhydric alcohol-added isocyanate obtained by reacting to such an isocyanate a compound having at least two active hydrogen atoms in its molecule, such as trimethylol propane or pentaerythritol, or an isocyanate compound having the isocyanate group blocked by a reaction with a phenol such as phenol, m-cresol or resorcinol, a tertiary alcohol such tert-butyl alcohol, or a secondary amine such as iso-propyl amine, may also be used.

The epoxy compound is not particularly limited and may, for example, be a polyepoxy compound having at least two epoxy groups in the molecule, which is usually obtained by reacting a halohydrin group with a polyhydric alcohol or a polyhydric phenol. Such a compound may, for example, be 1,4-diphenylmethane glycidyl ether obtainable by the reaction of epichlorohydrin with bisphenol, or polyethylene glycol diglycidyl ether obtainable by the reaction of epichlorohydrin with polyethylene glycol.

In the case of a mixture of an isocyanate compound and an epoxy compound, the above-mentioned isocyanate compound and epoxy compound may be mixed, and in such a case, the mixing ratio is not particularly limited.

A solvent used for forming a treating agent containing such an isocyanate compound and/or an epoxy compound, is not particularly limited and may, for example, be an aromatic hydrocarbon such as benzene or toluene, an aliphatic ketone such as acetone or methyl ethyl ketone, an ester such as ethyl acetate, or a halogenated hydrocarbon such as methylene chloride. Further, an isocyanate compound having an isocyanate group blocked, or a polyoxy compound, may be used also as a latex. To such a treating liquid, one or more latexes may be incorporated as the case requires, which are selected from the group consisting of natural rubber, chloroprene rubber, styrene/butadiene rubber, acrylonitrile/butadiene rubber, chlorinated polyethylene, chlorosulfonated polyethylene, epichlorohydrin rubber, natural rubber latex, chloroprene rubber latex, styrene/butadiene rubber latex, acrylonitrile/butadiene rubber latex and styrene/butadiene/vinyl pyridineterpolymer latex.

The elastic body in the present invention is a reinforced elastic body which has been reinforced by curing and bonding a chlorosulfonated polyolefin compound and the above treated polyester fiber for reinforcing chlorosulfonated polyolefin.

As a method for curing and bonding, in a case where the fiber is in the form of a code, a woven fabric or a sheet, the treated polyester fiber in such a form having the above described treatment applied, is brought in close contact with the chlorosulfonated polyolefin compound, followed by curing to simultaneously conduct the curing of the chlorosulfonated polyolefin compound and bonding to the fiber, to obtain an elastic body. In a case where the fiber is in the form of a short fiber, a chlorosulfonated polyolefin compound and the treated polyester short fiber having the above described treatment applied thereto, are mixed, followed by curing to conduct curing of the chlorosulfonated polyolefin compound and bonding with the fiber simultaneously, to obtain an elastic body. The curing method for curing and bonding may, for example, be press curing, steam curing, hot air curing, UHF curing, electron beam curing or molten salt curing. Either method may be employed.

Here, the chlorosulfonated polyolefin is a general term for a product obtained by chlorination and chlorosulfonation of a polyolefin which may be polyethylene or an ethylene/$\alpha$-olefin copolymer. For example, it may be chlorosulfonated polyethylene, a chlorosulfonated ethylene/propylene copolymer, a chlorosulfonated ethylene/butene-1 copolymer, a chlorosulfonated ethylene/hexene-1 copolymer or a chlorosulfonated ethylene/vinyl acetate copolymer. Such a chlorosulfonated polyolefin may be the one wherein the chlorine content and the sulfur content are from 20 to 60 wt % and from 0.3 to 3.0 wt %, respectively.

Presently commercially available chlorosulfonated polyolefins include, for example, TOSO-CSM (trademark) and extos (trademark) manufactured by TOSOH CORPORATION. Grades of TOSO-CSM (trademark) include TS-530, TS-430, TS-930 and CN-1180. Likewise, grades of extos (trademark) include ET-8010 and ET-8510. To such a chlorosulfonated polyolefin, a curing agent, a curing assistant, a reinforcing filler, a plasticizer, a processing assistant, an age-preventing agent, etc. may be incorporated, as the case requires.

When the elastic body of the present invention is used for a dynamic application as e.g. a belt, a boot or an air spring, the chlorosulfonated polyolefin to be used, is preferably the one obtained by chlorinating and chlorosulfonating an ethylene/$\alpha$-olefin copolymer such as a chlorosulfonated ethylene/propylene copolymer, a chlorosulfonated ethylene/butene-1 polymer, a chlorosulfonated ethylene-hexene-1 copolymer or a chlorosulfonated ethylene/vinyl acetate copolymer, which is excellent in cold resistance, flexibility and dynamic properties. In such a case, the chlorine content and the sulfur content of the chlorosulfonated polyolefin are preferably from 20 to 33 wt % and from 0.3 to 1.5 wt %, respectively.

Now, the present invention will be described in further detail with reference to Examples. However, it should be understood that the present invention is by no means restricted to such specific Examples.

EXAMPLE 1

Preparation of 2,3-dichlorobutadiene homopolymer latex (1)

Into a reactor having an internal capacity of 10 l and equipped with a pressure meter, a thermometer, a condenser and a stirrer, 2,000 g of 2,3-dichlorobutadiene monomer and 6 g of n-dodecylmercaptan as a chain transfer agent, were charged. Then, a mixture prepared by mixing 144 g of disproportionated rosin soap (surfactant) as an emulsifier, 7 g of a condensation product (surfactant) of sodium naphthalene sulfonate with formaldehyde and 24.2 g of 20% sodium hydroxide to 4,000 g of water, was charged into the reactor, followed by emulsification. As a polymerization catalyst, 0.25 g of hydrosulfite, 1.8 g of potassium persulfate and 0.3 g of sodium anthraquinone sulfonate were dissolved in 200 g of water, and the solution was introduced into the reactor, followed by polymerization at a temperature of from 10 to 50° C. An unreacted monomer was removed by steam distillation to obtain a latex having a solid content of 34.3 wt %.

Preparation of resorcinol/formaldehyde mixed solution

To a solution having 1 g of sodium hydroxide dissolved in 242 g of water, 11 g of resorcinol and 10.3 g of 35% of formaldehyde were mixed, and the mixture was left to stand and aged at 23° C. for 5 hours.

Preparation of RFL 264.3 g of the above resorcinol/formaldehyde mixed liquid was mixed to 295 g of the above 2,3-dichlorobutadiene homopolymer latex (1) and 83 g of water, and the mixture was left to stand and aged at 23° C. for 24 hours to obtain a resorcinol/formaldehyde/latex mixed liquid (the total amount of surfactant: 1.09 wt %).

Surface treatment of polyester and curing and bonding

For pre-treatment, a polyester woven fabric was immersed in a pre-treatment solution prepared by diluting 5 parts by weight of an isocyanate (Desmodule RE, manufactured by Bayer) with 95 parts by weight of ethyl acetate followed by drying and baking in a constant temperature drier at 180° C. for 3 minutes. Then, the fabric was immersed once in the above-mentioned resorcinol/formaldehyde/latex mixed liquid, followed by drying and baking in a constant temperature drier at 180° C. for 3 minutes. The coated state of RFL on the treated fiber thus obtained, was inspected, and the results are shown in Table 2.

The treated fiber thus obtained was placed on a blend of an alkylated chlorosulfonated polyethylene (extos (trademark) ET-8010, manufactured by TOSOH CORPORATION) having a composition as identified in Table 1, which was put in a mold of 150×150×5 mm, followed by curing and bonding at 160° C. for 30 minutes. The obtained cured sheet was cut in a strip shape having a width of 25.4 mm to obtain a test specimen.

TABLE 1

| | |
|---|---|
| Alkylated chlorosulfonated polyethylene[1] | 100 parts by weight |
| Magnesium oxide | 4 parts by weight |
| SRF carbon | 40 parts by weight |
| Pentaerythritol[2] | 3 parts by weight |
| Dipentamethylenethiuram tetrasulfide[3] | 2 parts by weight |

Notes:

1) extos (trademark) ET-8010, manufactured by TOSOH CORPORATION
2) Noilizer (trademark) P, manufactured by Nippon Gosei Kagaku K.K.
3) Accelerator TRA, manufactured by Ouchi Shinko Kagaku K.K.

Measurement of bond strength

The bond strength (180° peel strength) was measured by a tensile tester at an elastic stress rate of 50 mm/min. The results are shown in Table 2.

TABLE 2

| | Example 1 | Example 2 | Example 3 | Example 4 |
|---|---|---|---|---|
| Pretreatment liquid | | | | |
| Desmodule RE | 5 | 5 | 5 | 5 |
| Ethyl acetate | 95 | 95 | 95 | 95 |
| RFL liquid | | | | |
| Resorcinol | 11.0 | 11.0 | 11.0 | 11.0 |
| Formaldehyde (35%) | 10.3 | 10.3 | 10.3 | 10.3 |
| Sodium hydroxide | 1.0 | 1.0 | 1.0 | 1.0 |
| 2,3-DCB-containing latex (1) | 295.0 | — | — | — |
| 2,3-DCB-containing latex (2) | — | 295.0 | — | 295.0 |
| 2,3-DCB-containing latex (3) | — | — | 295.0 | — |
| 2,3-DCB-containing latex (4) | — | — | — | — |
| Chloroprene rubber latex | — | — | — | — |
| Vinyl pyridine latex | — | — | — | — |
| SBR latex | — | — | — | — |
| NBR latex | — | — | — | — |
| Sodium lauryl sulfate | — | 3.3 | 3.3 | 13.3 |
| Sodium dodecylbenzene sulfonate | — | — | — | — |
| Sodium alkylnaphthalene sulfonate | — | — | — | — |
| Sodium polyoxyethylene alkyl ether sulfate | — | — | — | — |
| Disproportionated rosin soap | — | — | — | — |
| Polyoxyethylene lauryl ether | — | — | — | — |
| Polyoxyethylene higher alcohol ether | — | — | — | — |
| Polyoxylethylene nonyl phenyl ether | — | — | — | — |
| Polyoxylethylene derivative | — | — | — | — |
| Water | 325.0 | 325.0 | 325.0 | 325.0 |
| Coated state of RFL | Uniform | Uniform | Uniform | Uniform |
| Average peel strength (kg/inch) | 27 | 27 | 28 | 23 |
| Peeled state* | R | R | R | R |

| | Example 5 | Example 6 | Example 7 |
|---|---|---|---|
| Pretreatment liquid | | | |
| Desmodule RE | 5 | 5 | 5 |
| Ethyl acetate | 95 | 95 | 95 |
| RFL liquid | | | |
| Resorcinol | 11.0 | 11.0 | 11.0 |
| Formaldehyde (35%) | 10.3 | 10.3 | 10.3 |
| Sodium hydroxide | 1.0 | 1.0 | 1.0 |
| 2,3-DCB-containing latex (1) | — | — | — |

TABLE 2-continued

| | | | |
|---|---|---|---|
| 2,3-DCB-containing latex (2) | 295.0 | 295.0 | 295.0 |
| 2,3-DCB-containing latex (3) | — | — | — |
| 2,3-DCB-containinq latex (4) | — | — | — |
| Chloroprene rubber latex | — | — | — |
| Vinyl pyridine latex | — | — | — |
| SBR latex | — | — | — |
| NBR latex | — | — | — |
| Sodium lauryl sulfate | — | — | — |
| Sodium dodecylbenzene sulfonate | 4.0 | — | — |
| Sodium alkylnaphthalene sulfonate | — | 2.9 | — |
| Sodium polyoxyethylene alkyl ether sulfate | — | — | 3.8 |
| Disproportionated rosin soap | — | — | — |
| Polyoxyethylene lauryl ether | — | — | — |
| Polyoxyethylene higher alcohol ether | — | — | — |
| Polyoxylethylene nonyl phenyl ether | — | — | — |
| Polyoxylethylene derivative | — | — | — |
| Water | 325.0 | 325.0 | 325.0 |
| Coated state of RFL | Uniform | Uniform | Uniform |
| Average peel strength (kg/inch) | 30 | 28 | 25 |
| Peeled state* | R | R | R |

*Peeled state

R: cohesive failure of the rubber composition,
R-C: cohesive failure at a part of the peeled surface,
C: interfacial peeling between the rubber

EXAMPLE 2

The operation was carried out in the same manner as in Example 1 except that the latex component was changed to the following 2,3-dichlorobutadiene homopolymer latex (2) and the preparation of RFL was changed to the following method, and the bond strength was measured. The results are shown in Table 2.

Preparation of 2,3-dichlorobutadiene homopolymer latex (2)

Into a reactor having an internal capacity of 10 l and equipped with a pressure meter, a thermometer, a condenser and a stirrer, 2,000 g of 2,3-dichlorobutadiene monomer and 6 g of n-dodecyl mercaptan as a chain transfer agent were charged. Then, as an emulsifier, 72 g of disproportionated rosin soap (surfactant), 7 g of a condensation product (surfactant) of sodium naphthalene sulfonate with formaldehyde and 24.2 of 20% sodium hydroxide were mixed to 4,000 g of water, and the mixture was charged into the reactor, followed by emulsification. As a polymerization catalyst, 0.25 g of hydrosulfite, 1.8 g of potassium persulfate and 0.3 g of sodium anthraquinone sulfonate were dissolved in 200 g of water, and the solution was introduced into the reactor, followed by polymerization at a temperature of from 10 to 50° C. An unreacted monomer was removed by steam distillation to obtain a latex having a solid content of 33.8 wt %.

Preparation of RFL 3.3 g of sodium lauryl sulfate (Emar 2F Needle (30% concentration), manufactured by Kao Corporation) was added as a surfactant to 295 g of the above 2,30dichlorobutadiene homopolymer latex (2), and the mixture was thoroughly stirred until it became uniform. Then, 83 g of water was added thereto, and 26.3 g of a resorcin/formaldehyde mixed liquid prepared in the same manner as in Example 1, was mixed thereto. The mixture as left to stand and aged at 23° C. for 24 hours to obtain a resorcinol/formaldehyde/latex mixed liquid (total amount of surfactant: 0.73 wt %).

EXAMPLE 3

The operation was carried out in the same manner as in Example 2 except that the latex component was changed to the following 2,3-dichlorobutadiene homopolymer latex (3), and the bond strength was measured (total amount of surfactant: 0.57 wt %). The results are shown in Table 2.

Preparation of 2,3-dichlorobutadiene homopolymer latex (3)

Into a reactor having an internal capacity of 10 l and equipped with a pressure meter, a thermometer, a condenser and a stirrer, 2,000 g of 2,3-dichlorobutadiene monomer and 6 g of n-dodecyl mercaptan as a chain transfer agent were charged. Then, as an emulsifier, 52 g of disproportionated rosin soap (surfactant), 5 g of a condensation product (surfactant) of sodium naphthalene sulfonate with formaldehyde and 24.2 of 20% sodium hydroxide were mixed to 4,000 of water, and the mixture was charged into the rector, followed by emulsification. As a polymerization catalyst, 0.25 g of hydrosulfite, 1.8 g of potassium persulfate and 0.3 g of sodium anthraquinone sulfonate were dissolved in 200 g of water, and the solution was introduced into the reactor, followed by polymerization at a temperature of from 10 to 50° C. An unreacted monomer was removed by steam distillation, to obtain a latex having an solid content of 33.7 wt %.

EXAMPLE 4

The curing and bonding were carried out in the same manner as in Example 2 except that the amount of the surfactant added subsequently to the latex component during the preparation of RFL, was changed to 13.3 g, and the bond strength was measured (total amount of surfactant: 1.18 wt %). The results are shown in Table 2.

EXAMPLE 5

The curing and bonding were carried out in the same manner as in Example 2 except that the surfactant added subsequently to the latex component during the preparation of RFL was changed to sodium dodecyl benzene sulfonate (Neopelex (trademark) No. 25 (25% concentration), manufactured by Kao Corporation), and its amount was changed to 4.0 g, and the bond strength was measured (total amount of surfactant: 0.73 wt %). The results are shown in Table 2.

EXAMPLE 6

The curing and bonding were carried out in the same manner as in Example 2 except that the surfactant added subsequently to the latex component during the preparation of RFL was changed to sodium alkyl naphthalene sulfonate (Pelex (trademark) NB-L (35% concentration), manufactured by Kao Corporation) and its amount was changed to 2.9 g, and the bond strength was measured (total amount of surfactant: 0.73 wt %). The results are shown in Table 2.

EXAMPLE 7

The curing and bonding were carried out in the same manner as in Example 2 except that the surfactant added subsequently to the latex component during the preparation of RFL was changed to sodium polyoxyethylene alkyl ether sulfate (Levenol (trademark) WX (26% concentration), manufactured by Kao Corporation) and its amount was changed to 3.8 g, and the bond strength was measured (total amount of surfactant: 0.73 wt %). The results are shown in Table 2.

EXAMPLE 8

The curing and bonding were carried out in the same manner as in Example 2 except that the surfactant added subsequently to the latex component during the preparation of RFL was changed to disproportionated rosin soap (Ronsis (trademark) K-25 (25% concentration), manufactured by Arakawa Kagaku Kogyo K.K.) and its amount was changed to 4.0 g, and the bond strength was measured (total amount of surfactant: 0.73 wt %). The results are shown in Table 3.

TABLE 3

|  | Example 8 | Example 9 | Example 10 |
|---|---|---|---|
| Pretreatment liquid |  |  |  |
| Desmodule RE | 5 | 5 | 5 |
| Ethyl acetate | 95 | 95 | 95 |
| RFL liquid |  |  |  |
| Resorcinol | 11.0 | 11.0 | 11.0 |
| Formaldehyde (35%) | 10.3 | 10.3 | 10.3 |
| Sodium hydroxide | 1.0 | 1.0 | 1.0 |
| 2,3-DCB-containing latex (1) | — | — | — |
| 2,3-DCB-containing latex (2) | 295.0 | 295.0 | 295.0 |
| 2,3-DCB-containing latex (3) | — | — | — |
| 2,3-DCB-containing latex (4) | — | — | — |
| Chloroprene rubber latex | — | — | — |
| Vinyl pyridine latex | — | — | — |
| SBR latex | — | — | — |
| NBR latex | — | — | — |
| Sodium lauryl sulfate | — | — | — |
| Sodium dodecylbenzene sulfonate | — | — | — |
| Sodium alkylnaphthalene sulfonate | — | — | — |
| Sodium polyoxyethylene alkyl ether sulfate | — | — | — |
| Disproportionated rosin soap | 4.0 | — | — |
| Polyoxyethylene lauryl ether | — | 1.0 | — |
| Polyoxyethylene higher alcohol ether | — | — | 1.0 |
| Polyoxylethylene nonyl phenyl ether | — | — | — |
| Polyoxylethylene derivative | — | — | — |
| Water | 325.0 | 325.0 | 325.0 |
| Coated state of RFL | Uniform | Uniform | Uniform |
| Average peel strength (kg/inch) | 27 | 28 | 29 |
| Peeled state* | R | R | R |

|  | Example 11 | Example 12 | Example 13 |
|---|---|---|---|
| Pretreatment liquid |  |  |  |
| Desmodule RE | 5 | 5 | 5 |
| Ethyl acetate | 95 | 95 | 95 |
| RFL liquid |  |  |  |
| Resorcinol | 11.0 | 11.0 | 11.0 |
| Formaldehyde (35%) | 10.3 | 10.3 | 10.3 |
| Sodium hydroxide | 1.0 | 1.0 | 1.0 |
| 2,3-DCB-containing latex (1) | — | — | — |
| 2,3-DCB-containing latex (2) | 295.0 | 295.0 | — |
| 2,3-DCB-containing latex (3) | — | — | — |
| 2,3-DCB-containing latex (4) | — | — | 295.3 |
| Chloroprene rubber latex | — | — | — |
| Vinyl pyridine latex | — | — | — |
| SBR latex | — | — | — |
| NBR latex | — | — | — |
| Sodium lauryl sulfate | — | — | 3.3 |
| Sodium dodecylbenzene sulfonate | — | — | — |
| Sodium alkylnaphthalene sulfonate | — | 11 | — |
| Sodium polyoxyethylene alkyl ether sulfate | — | — | — |
| Disproportionated rosin soap | — | — | — |
| Polyoxyethylene lauryl ether | — | — | — |
| Polyoxyethylene higher alcohol ether | — | — | — |
| Polyoxylethylene nonyl phenyl ether | 1.0 | — | — |
| Polyoxylethylene derivative | — | 1.0 | — |
| Water | 325.0 | 325.0 | 325.0 |
| Coated state of RFL | Uniform | Uniform | Uniform |
| Average peel strength (kg/inch) | 28 | 26 | 23 |
| Peeled state* | R | R | R |

*Peeled state

R: cohesive failure of the rubber composition,
R-C: cohesive failure at a part of the peeled surface,
C: interfacial peeling between the rubber

EXAMPLE 9

The curing and bonding were carried out in the same manner as in Example 2 except that the surfactant added subsequently to the latex component during the preparation of RFL was changed to polyoxyethylene lauryl ether (Emulgen (trademark) 106, manufactured by Kao Corporation) and its amount was changed to 1.0 g, and the bond strength was measured (total amount of surfactant: 0.73 wt %). The results are shown in Table 3.

EXAMPLE 10

The curing and bonding were carried out in the same manner as in Example 2 except that the surfactant added subsequently to the latex component during the preparation of RFL was changed to polyoxyethylene higher alcohol ether (Emulgen (tradename) 707, manufactured by Kao Corporation) and its amount was changed to 1.0 g, and the bond strength was measured (total amount of surfactant: 0.73 wt %). The results are shown in Table 3.

EXAMPLE 11

The curing and bonding were carried out in the same manner as in Example 2 except that the surfactant added subsequently to the latex component during the preparation of RFL was changed to polyoxyethylene nonylphenyl ether (Emulgen (trademark) 909, manufactured by Kao Corporation) and its amount was changed to 1.0 g, and the bond strengtn was measured (total amount of surfactant: 0.73 wt %). The results are shown in Table 3.

EXAMPLE 12

The curing and bonding were carried out in the same manner as in Example 2 except that the surfactant added subsequently to the latex component during the preparation of RFL was changed to a polyoxyethylene derivative (Emulgen (trademark) A-90, manufactured by Kao Corporation) and its amount was changed to 1.0 g, and the bond strength was measured (total amount of surfactant: 0.73 wt %). The results are shown in Table 3.

EXAMPLE 13

The operation was carried out in the same manner as in Example 2 except that the latex component was changed to the following chloroprene/2,3-dichlorobutadiene copolymer latex (4), and the bond strength was measured. The results are shown in Table 3.

Preparation of chloroprene/2,3-dichlorobutadiene copolymer latex (4)

In the same manner as for the 2,3-dichlorobutadiene homopolymer latex as disclosed in Example 1 except that 400 g of chloroprene monomer and 1600 g of 2,3-dichlorobutadiene monomer were used, a latex having a solid content of 33.8 wt %, was obtained (total amount of surfactant: 1.24 wt %).

Comparative Example 1

The curing and bonding were carried out in the same manner as in Example 2 except that the method of adding a surfactant in the preparation of RFL was changed in such a manner that the surfactant was added all at once at the time of polymerization of the polymer component of the latex (the amount of added surfactant: 0.58 wt %), and no surfactant was added in the subsequent step, and the bond strength was measured. The results are shown in Table 4. As is evident from Table 4, the coated state of RFL was non-uniform, and the peel strength was low.

TABLE 4

|  | Comparative Example 1 | Comparative Example 2 | Comparative Example 3 | Comparative Example 4 |
|---|---|---|---|---|
| Pretreatment liquid |  |  |  |  |
| Desmodule RE | 5 | 5 | 5 | 5 |
| Ethyl acetate | 95 | 95 | 95 | 95 |
| RFL liquid |  |  |  |  |
| Resorcinol | 11.0 | 11.0 | 11.0 | 11.0 |
| Formaldehyde (35%) | 10.3 | 10.3 | 10.3 | 10.3 |
| Sodium hydroxide | 1.0 | 1.0 | 1.0 | 1.0 |
| 2,3-DCB-containing latex (1) | — | — | — | — |
| 2,3-DCB-containing latex (2) | 295.0 | 295.0 | — | — |
| 2,3-DCB-containing latex (3) | — | — | 295.0 | 295.0 |
| 2,3-DCB-containing latex (4) | — | — | — | — |
| Chloroprene rubber latex | — | — | — | — |
| Vinyl pyridine latex | — | — | — | — |
| SBR latex | — | — | — | — |
| NBR latex | — | — | — | — |
| Sodium lauryl sulfate | — | — | — | 1.0 |
| Sodium dodecylbenzene sulfonate | — | — | — | — |
| Sodium alkylnaphthalene sulfonate | — | — | — | — |
| Sodium polyoxyethylene alkyl ether sulfate | — | — | — | — |
| Disproportionated rosin soap | — | — | — | — |
| Polyoxyethylene lauryl ether | — | — | — | — |
| Polyoxyethylene higher alcohol ether | — | — | — | — |
| Polyoxylethylene nonyl phenyl ether | — | — | — | — |
| Polyoxylethylene derivative | — | — | — | — |
| Water | 325.0 | 325.0 | 325.0 | 325.0 |
| Coated state of RFL | Non-uniform | Uniform | Non-uniform | Non-uniform |
| Average peel strength (kg/inch) | 14 | 26 | 12 | 17 |
| Peeled state* | R-C | R | R-C | R-C |

TABLE 4-continued

|  | Comparative Example 5 | Comparative Example 6 | Comparative Example 7 | Comparative Example 8 |
|---|---|---|---|---|
| Pretreatment liquid |  |  |  |  |
| Desmodule RE | 5 | 5 | 5 | 5 |
| Ethyl acetate | 95 | 95 | 95 | 95 |
| RFL liquid |  |  |  |  |
| Resorcinol | 11.0 | 11.0 | 11.0 | 11.0 |
| Formaldehyde (35%) | 10.3 | 10.3 | 10.3 | 10.3 |
| Sodium hydroxide | 1.0 | 1.0 | 1.0 | 1.0 |
| 2,3-DCB-containing latex (1) | — | — | — | — |
| 2,3-DCB-containing latex (2) | 295.0 | — | 295.3 | 295.3 |
| 2,3-DCB-containing latex (3) | — | 295.0 | — | — |
| 2,3-DCB-containing latex (4) | — | — | — | — |
| Chloroprene rubber latex | — | — | — | — |
| Vinyl pyridine latex | — | — | — | — |
| SBR latex | — | — | — | — |
| NBR latex | — | — | — | — |
| Sodium lauryl sulfate | 50.0 | — | — | 3.3 |
| Sodium dodecylbenzene sulfonate | — | — | — | — |
| Sodium alkylnaphthalene sulfonate | — | — | — | — |
| Sodium polyoxyethylene alkyl ether sulfate | — | — | — | — |
| Disproportionated rosin soap | — | — | — | — |
| Polyoxyethylene lauryl ether | — | 0.3 | 15.0 | — |
| Polyoxyethylene higher alcohol ether | — | — | — | — |
| Polyoxylethylene nonyl phenyl ether | — | — | — | — |
| Polyoxylethylene derivative | — | — | — | — |
| Water | 325.0 | 325.0 | 325.0 | 325.0 |
| Coated state of RFL | Uniform | Non-uniform | Uniform | Uniform |
| Average peel strength (kg/inch) | 18 | 18 | 17 | 7 |
| Peeled state* | C | R-C | C | C |

*Peeled state

R: cohesive failure of the rubber composition,
R-C: cohesive failure at a part of the peeled surface,
C: interfacial peeling between the rubber conposition and the reinforcing fiber

Comparative Example 2

The curing and bonding were carried out in the same manner as in Comparative Example 1 except that in the surface treating step, the operation of immersing in the resorcin/formaldehyde/latex mixture the polyester woven fabric pretreated with an ethyl acetate solution of an isocyanate (Desmodule RE, manufactured by Bayer), followed by drying, was repeated three times, followed by baking, and the bond strength was measured (total amount of surfactant:

0.58 wt %). The results are shown in Table 4. As is evident from Table 4, it was necessary to repeat the operation of dipping and drying three times, whereby the treating step was cumbersome.

Comparative Example 3

The curing and bonding were carried out in the same manner as in Example 3 except that the manner of adding the surfactant during the preparation of RFL was changed in such a manner that the surfactant was added all at once at the time of polymerizing the polymer component of the latex, and no surfactant was added in the subsequent step, and the bond strength was measured (total amount of surfactant: 0.42 wt %). The results are shown in Table 4. As is evident from Table 4, the coated state of RFL was non-uniform, and the peel strength was low.

Comparative Example 4

The curing and bonding were carried out in the same manner as in Example 3 except that the amount of the surfactant added subsequently to the latex component during the preparation of RFL was changed to 1.0 g, and the bond strength was measured (total amount of surfactant: 0.46 wt %). The results are shown in Table 4. As is evident from Table 4, the coated state of RFL was non-uniform, and the peel strength was low.

Comparative Example 5

The curing and bonding were carried out in the same manner as in Example 2 except that the amount of the surfactant added subsequently to the latex component during the preparation of RFL was changed to 50.0 g, and the bond strength was measured (total amount of surfactant: 2.7 wt %). The results are shown in Table 4. As is evident from Table 4, the coated state of RFL was uniform, but the peel strength was low.

Comparative Example 6

The curing and bonding were carried out in the same manner as in Example 3 except that the surfactant added subsequently to the latex component during the preparation of RFL was changed to polyoxyethylene lauryl ether (Emulgen (trademark) 106, manufactured by Kao Corporation) and its amount was changed to 0.3 g, and the bond strength was measured (total amount of surfactant: 0.46 wt %). The results are shown in Table 4. As is evident from Table 4, the coated state of RFL was non-uniform, and the peel strength was low.

Comparative Example 7

The curing and bonding were carried out in the same manner as in Example 9 except that the amount of the surfactant added subsequently to the latex component during the preparation of RFL was changed to 15.0 g, and the bond strength was measured (total amount of surfactant: 2.85 wt %). The results are shown in Table 4. As is evident from Table 4, the coated state of RFL was uniform, but the peel strength was low.

Comparative Example 8

The curing and bonding were carried out in the same manner as in Example 2 except that the preparation of the resorcinol/formaldehyde mixed liquid and the preparation of RFL were changed to the following methods, and the bond strength was measured. The results are shown in Table 4. As is evident from Table 4, the coated state of RFL was uniform, but the peel strength was low.

Preparation of resorcin/formaldehyde mixed liquid 14.3 g of resorcinol and 0.9 g of 35% formaldehyde were mixed to a solution having 1 g of sodium hydroxide dissolved in 242 g of water, and the mixture was left to stand and aged at 23° C. for 5 hours (the molar ratio of resorcinol/formaldehyde=1/0.08).

Preparation of RFL 3.3 g of sodium lauryl sulfate (Emar 2F Needle (30% concentration), manufactured by Kao Corporation) was added as a surfactant to 295 g of the above 2,3-dichlorobutaduiene homopolymer latex (2), and the mixture was thoroughly stirred until it became uniform. Then, 83 g of water was added thereto, and 258.2 g of resorcinol/formaldehyde mixed liquid prepared as described above, was added thereto. The mixture was left to stand and aged at 23° C. for 24 hours to obtain a resorcinol/formaldehyde/latex mixed liquid (total amount of surfactant: 0.74 wt %).

Comparative Example 9

The curing and bonding were carried out in the same manner as in Example 2 except that the preparation of the resorcinol/formaldehyde mixed liquid and the preparation of RFL were changed to the following methods, and the bond strength was measured. The results are shown in Table 5. As is evident from Table 5, the coated state of RFL was uniform, but the peel strength was poor.

Preparation of resorcinol/formaldehyde mixed solution 5.6 g of resorcinol and 25.7 g of 35% formaldehyde were mixed to a solution having 1 g of sodium hydroxide dissolved in 242 g of water, and the mixture was left to stand and aged at 23° C. for 5 hours (molar ratio of resorcinol/formaldehyde=1/5.89).

Preparation of RFL 3.3 g of sodium lauryl sulfate (Emar 2F Needle (30% concentration), manufactured by Kao Corporation) was added as a surfactant to 295 g of the above 2,3-dichlorobutadiene homopolymer latex (2), and the mixture was thoroughly stirred until it became uniform. Then, 38 g of water was added thereto, and 274.3 g of the resorcin/formaldehyde mixed liquid prepared as described above, was mixed thereto. The mixture was left to stand and aged at 23° C. for 24 hours to obtain resorcinol/formaldehyde/latex mixed liquid (total amount of surfactant: 0.72 w%).

TABLE 5

|  | Comparative Example 9 | Comparative Example 10 | Comparative Example 11 | Comparative Example 12 |
| --- | --- | --- | --- | --- |
| Pretreatment liquid |  |  |  |  |
| Desmodule RE | 5 | 5 | 5 | 5 |
| Ethyl acetate | 95 | 95 | 95 | 95 |
| RFL liquid |  |  |  |  |
| Resorcinol | 5.6 | 0.55 | 88.0 | 11.0 |
| Formaldehyde (35%) | 25.7 | 0.52 | 82.4 | 10.3 |

TABLE 5-continued

| | | | | |
|---|---|---|---|---|
| Sodium hydroxide | 1.0 | 1.0 | 2.0 | 1.0 |
| 2,3-DCB-containing latex (1) | — | — | — | — |
| 2,3-DCB-containing latex (2) | 295.0 | 295.0 | 295.0 | 295.0 |
| 2,3-DCB-containing latex (3) | — | — | — | — |
| 2,3-DCB-containing latex (4) | — | — | — | — |
| Chloroprene rubber latex | — | — | — | — |
| Vinyl pyridine latex | — | — | — | — |
| SBR latex | — | — | — | — |
| NBR latex | — | — | — | — |
| Sodium lauryl sulfate | 3.3 | 3.3 | 18.0 | 50.0 |
| Sodium dodecylbenzene sulfonate | — | — | — | — |
| Sodium alkylnaphthalene sulfonate | — | — | — | — |
| Sodium polyoxyethylene alkyl ether sulfate | — | — | — | — |
| Disproportionated rosin soap | — | — | — | — |
| Polyoxyethylene lauryl ether | — | — | — | — |
| Polyoxyethylene higher alcohol ether | — | — | — | — |
| Polyoxylethylene nonyl phenyl ether | — | — | — | — |
| Polyoxylethylene derivative | — | — | — | — |
| Water | 325.0 | 268.0 | 748.4 | 1725.0 |
| Coated state of RFL | Uniform | Uniform | Uniform | Uniform |
| Average peel strength (kg/inch) | 5 | 10 | 15 | 14 |
| Peeled state* | C | C | R-C | C |

TABLE 5-continued

| | Comparative Example 13 | Comparative Example 14 | Comparative Example 15 |
|---|---|---|---|
| Pretreatment liquid | | | |
| Desmodule RE | 5 | 5 | 5 |
| Ethyl acetate | 95 | 95 | 95 |
| RFL liquid | | | |
| Resorcinol | 11.0 | 11.0 | 11.0 |
| Formaldehyde (35%) | 10.3 | 10.3 | 0.9 |
| Sodium hydroxide | 1.0 | 1.0 | 1.0 |
| 2,3-DCB-containing latex (1) | — | — | — |
| 2,3-DCB-containing latex (2) | — | — | — |
| 2,3-DCB-containing latex (3) | — | — | — |
| 2,3-DCB-containing latex (4) | — | — | — |
| Chloroprene rubber latex | 192.0 | 192.0 | — |
| Vinyl pyridine latex | — | — | 247.0 |
| SBR latex | — | — | — |
| NBR latex | — | — | — |
| Sodium lauryl sulfate | — | 3.3 | — |
| Sodium dodecylbenzene sulfonate | — | — | — |
| Sodium alkylnaphthalene sulfonate | — | — | — |
| Sodium polyoxyethylene alkyl ether sulfate | — | — | — |
| Disproportionated rosin soap | — | — | — |
| Polyoxyethylene lauryl ether | — | — | — |
| Polyoxyethylene higher alcohol ether | — | — | — |
| Polyoxylethylene nonyl phenyl ether | — | — | — |
| Polyoxylethylene derivative | — | — | — |
| Water | 428.0 | 428.0 | 373.0 |
| Coated state of RFL | Uniform | Uniform | Uniform |
| Average peel strength (kg/inch) | 2 | 3 | 2 |
| Peeled state* | C | C | C |

*Peeled state

R: cohesive failure of the rubber composition,
R-C: cohesive failure at a part of the peeled surface,
C: interfacial peeling between the rubber Comparative Example 10

The curing and bonding were carried out in the same manner as in Example 2 except that the preparation of the resorcinol/formaldehyde mixed liquid and the preparation of RFL were changed to the following methods, and the bond strength was measured. The results are shown in Table 5. As is evident from Table 5, the coated state of RFL was uniform, but the peel strength was low.
Preparation of resorcinol/formaldehyde mixed liquid
   0.55 g of resorcinol and 0.52 g of 35% formaldehyde were mixed to a solution having 1 g of sodium hydroxide dissolved in 242 g of water, and the mixture was left to stand and aged at 23° C for 5 hours.
Preparation of RFL
   3.3 g of sodium lauryl sulfate (Emar 2F Needle (30% concentration), manufactured by Kao Corporation), was added as a surfactant to 295 g of the above 2,3-dichlorobutadiene homopolymer latex (2), and the mixture was thoroughly stirred until it became uniform. Then, 26 g of water was added thereto, and 244.1 g of the resorcinol/formaldehyde mixed liquid prepared as described above, was mixed thereto. The mixture was left to stand and aged at 23° C. for 24 hours to obtain a resorcinol/formaldehyde/latex mixed liquid (the weight ratio of the latex solid content to the sum of resorcinol and formaldehyde: 1/137, total amount of surfactant: 0.83 wt %).

Comparative Example 11

The curing and bonding were carried out in the same manner as in Example 2 except that the preparation of the resorcinol/formaldehyde mixed liquid and the preparation of RFL were changed to the following methods, and the bond strength was measured. The results are shown in Table 5. As is evident from Table 5, the coated state of RFL was uniform, but the peel strength was low.
Preparation of resorcinol/formaldehyde mixed liquid
   88 g of resorcinol and 82.4 g of 35% formaldehyde were mixed to a solution having 2 g of sodium hydroxide dissolved in 484 g of water, and the mixture was left to stand and aged at 23° C. for 5 hours.
Preparation of RFL
   18.0 g of sodium lauryl sulfate (Emar 2F Needle (30% concentration), manufactured by Kao Corporation) was added as a surfactant to 295 g of the above 2,3-dichlrobutadiene homopolymer latex (2), and the mixture was thoroughly stirred until it became uniform. Then, 264.4 g of water was added thereto, and 656.4 g of the resorcinol/formaldehyde mixed liquid prepared as described above, was mixed thereto. The mixture was left to stand and aged at 23° C. for 24 hours to obtain a resorcinol/formaldehyde/ latex mixed liquid (the weight ratio of the latex solid content to the sum of resorcinol and formaldehyde: 1/0.86, total amount of surfactant: 0.74 wt %).

Comparative Example 12

The curing and bonding were carried out in the same manner as in Example 2 except that the preparation of RFL was changed to the following method, and the bond strength was measured. The results are shown in Table 5. As is evident from Table 5, the coated stated of RFL was uniform, but the peel strength was low.
Preparation of RFL 50.0 g of sodium lauryl sulfate (Emar 2F Needle (30% concentration), manufactured by Kao Corporation) was added as a surfactant to 295 g of the above 2,3-dichlorobutadiene homopolymer latex (2), and the mixture was thoroughly stirred until it became uniform. Then, 1,483 g of water was added thereto, and 264.3 g of the resorcinol/formaldehyde mixed liquid prepared as disclosed in Example 2, was mixed thereto. The mixture was left to stand and aged at 23° C. for 24 hours to obtain a resorcinol/formaldehyde/latex mixed liquid (the amount of the 2,3-dichlorobutadiene-containing polymer solid content of the latex in the resorcinol/formaldehyde/latex mixture: 4.8 wt %, total amount of surfactant: 0.89 wt %).

Comparative Example 13

The curing and bonding were carried out in the same manner as in Example 2 except that the preparation of RFL was changed to the following method, and the bond strength was measured. The results are shown in Table 5. As is evident from Table 5, the coated state of RFL was uniform, but the peel strength was low.
Preparation of RFL 186 g of water was added to 192 g of chloroprene rubber latex (Skyprene (trademark) LA-502 (solid content: 52%), manufactured by TOSOH CORPORATION) as the latex component of RFL, and 264.3 g of the resorcinol/formaldehyde mixed liquid prepared as described in Example 2, was mixed thereto. The mixture was left to stand and aged at 23° C. for 24 hours to obtain a resorcinol/formaldehyde/latex mixed liquid.

Comparative Example 14

The curing and bonding were carried out in the same manner as in Example 2 except that the preparation of RFL was changed to the following method, and the bond strength was measured. The results are shown in Table 5. As is evident from Table 5, the coated state of RFL was uniform, but the peel strength was low.
Preparation of RFL 3.3 g of sodium lauryl sulfate (Emar 2F Needle (30% concentration), manufactured by Kao Corporation) was added as a surfactant to 192 g of chloroprene rubber latex (Skyprene (trademark) LA-502 (solid content: 52%), manufactured by TOSOH CORPORATION) as the latex component of RFL, and the mixture was thoroughly stirred until it became uniform. Then, 186 g of water was added thereto, and 264.3 g of the resorcinol/formaldehyde mixed liquid prepared as described in Example 2, was mixed thereto. The mixture was left to stand and aged at 23° C. for 24 hours to obtain a resorcinol/formaldehyde/latex mixed liquid.

Comparative Example 15

The curing and bonding were carried out in the same manner as in Example 2 except that the preparation of RFL was changed to the following method, and the bond strength was measured. The results are shown in Table 5. As is evident from Table 5, the coated state of RFL was uniform, but the peel strength was low.
Preparation of RFL 131 g of water was added to 247 g of vinyl pyridine latex (Nipol (trademark) 2518FS (solid content: 40.5%), manufactured by Nippon Zeon Co., Ltd.) as the latex component of RFL, and 264.3 g of the resorcinol/formaldehyde mixed liquid prepared as described in Example 2, was mixed thereto. The mixture was left to stand and aged at 23° C. for 24 hours to obtain a resorcinol/formaldehyde/latex mixed liquid.

Comparative Example 16

The curing and bonding were carried out in the same manner as in Example 2 except that the preparation of RFL was changed to the following method, and the bond strength was measured. The results are shown in Table 6. As is evident from Table 6, the coated state of RFL was uniform, but the peel strength was low.
Preparation of RFL 3.3 g of sodium lauryl sulfate (Emar 2F Needle (30% concentration), manufactured by Kao Corporation) was added as a surfactant to 247 g of vinyl pyridine latex (Nipol (trademark) 2518FS (solid content: 40.5%), manufactured by Nippon Zeon Co., Ltd.) as the latex component of RFL, and the mixture was thoroughly stirred until it became uniform. Then, 131 g of water was added thereto, and 264.3 g of the resorcinol/formaldehyde mixed liquid prepared as described in Example 2, was mixed thereto. The mixture was left to stand and aged at 23° C. for 24 hours to obtain a resorcinol/formaldehyde/latex mixed liquid.

TABLE 6

|  | Comparative Example 16 | Comparative Example 17 | Comparative Example 18 | Comparative Example 19 |
|---|---|---|---|---|
| Pretreatment liquid |  |  |  |  |
| Desmodule RE | 5 | 5 | 5 | 5 |
| Ethyl acetate | 95 | 95 | 95 | 95 |
| RFL liquid |  |  |  |  |
| Resorcinol | 5.6 | 0.55 | 88.0 | 11.0 |
| Formaldehyde (35%) | 25.7 | 0.52 | 82.4 | 10.3 |
| Sodium hydroxide | 1.0 | 1.0 | 2.0 | 1.0 |
| 2,3-DCB-containing latex (1) | — | — | — | — |
| 2,3-DCB-containing latex (2) | — | — | — | — |
| 2 3-DCB-containing latex (3) | — | — | — | — |
| 2,3-DCB-containing latex (4) | — | — | — | — |
| Chloroprene rubber latex | — | — | — | — |
| Vinyl pyridine latex | 247.0 | — | — | — |
| SBR latex | — | 247.0 | 247.0 | — |
| NBR latex | — | — | — | 244.0 |
| Sodium lauryl sulfate | 3.3 | — | 3.3 | — |
| Sodium dodecylbenzene | — | — | — | — |

TABLE 6-continued

| | | | | |
|---|---|---|---|---|
| sulfonate | | | | |
| Sodium alkylnaphthalene sulfonate | — | — | — | — |
| Sodium polyoxyethylene alkyl ether sufate | — | — | — | — |
| Disproportionated rosin soap | — | — | — | — |
| Polyoxyethylene lauryl ether | — | — | — | — |
| Polyoxyethylene higher alcohol ether | — | — | — | — |
| Polyoxylethylene nonyl phenyl ether | — | — | — | — |
| Polyoxylethylene derivative | — | — | — | — |
| Water | 373.0 | 373.0 | 373.0 | 376.0 |
| Coated state of RFL | Uniform | Uniform | Uniform | Uniform |
| Average peel strength (kg/inch) | 2 | 3 | 3 | 2 |
| Peeled state* | C | C | C | C |

| | Comparative Example 20 | Comparative Example 21 | Comparative Example 22 |
|---|---|---|---|
| Pretreatment liquid | | | |
| Desmodule RE | 5 | — | — |
| Ethyl acetate | 95 | — | — |
| RFL liquid | | | |
| Resorcinol | 11.0 | 11.0 | 11.0 |
| Formaldehyde (35%) | 10.3 | 10.3 | 10.3 |
| Sodium hydroxide | 1.0 | 1.0 | 1.0 |
| 2,3-DCB-containing latex (1) | — | 295.0 | — |
| 2,3-DCB-containing latex (2) | — | — | 295.0 |
| 2,3-DCB-containing latex (3) | — | — | — |
| 2,3-DCB-containing latex (4) | — | — | — |
| Chloroprene rubber latex | — | — | — |
| Vinyl pyridine latex | — | — | — |
| SBR latex | — | — | — |
| NBR latex | 244.0 | — | — |
| Sodium lauryl sulfate | 3.3 | — | 3.3 |
| Sodium dodecylbenzene sulfonate | — | — | — |
| Sodium alkylnaphthalene sulfonate | — | — | — |
| Sodium polyoxyethylene alkyl ether sulfate | — | — | — |
| Disproportionated rosin soap | — | — | — |
| Polyoxyethylene lauryl ether | — | — | — |
| Polyoxyethylene higher alcohol ether | — | — | — |
| Polyoxylethylene nonyl phenyl ether | — | — | — |
| Polyoxylethylene derivative | — | — | — |
| Water | 376.0 | 325.0 | 325.0 |
| Coated state of RFL | Uniform | Non-uniform | Uniform |
| Average peel strength (kg/inch) | 2 | 1 | 1 |
| Peeled state* | C | C | C |

*Peeled state

R: cohesive failure of the rubber composition,
R-C: cohesive failure at a part of the peeled surface,
C: interfacial-peeling between the rubber

Comparative Example 17

The curing and bonding were carried out in the same manner as in Example 2 except that the preparation of RFL was changed to the following method, and the bond strength was measured. The results are shown in Table 6. As is evident from Table 6, the coated state of RFL was uniform, but the peel strength was low.
Preparation of RFL
131 g of water was added to 247 g of SBR latex (Nipol (trademark) LX-110 (solid content: 40.5%), manufactured by Nippon Zeon Co., Ltd.) as the latex component of RFL, and 264.3 g of the resorcinol/formaldehyde mixed liquid prepared as described in Example 2, was mixed thereto. The mixture was left to stand and aged at 23° C. for 24 hours to obtain a resorcinol/formaldehyde/latex mixed liquid.

Comparative Example 18

The curing and bonding were carried out in the same manner as in Example 2 except that the preparation of RFL was changed to the following method, and the bond strength was measured. The results are shown in Table 6. As is evident from Table 6, the coated state of RFL was uniform, but the peel strength was low.
Preparation of RFL
3.3 g of sodium lauryl sulfate (Emar 2F Needle (30% concentration), manufactured by Kao Corporation) was added as a surfactant to 247 g of SBR latex (Nipol (trademark) LX-110 (solid content: 40.5%), manufactured by Nippon Zeon Co., Ltd.) as the latex component of RFL, and the mixture was thoroughly stirred until it became uniform. Then, 131 g of water was added thereto, and 264.3 g of the resorcinol/formaldehyde mixed liquid prepared as described in Example 2, was mixed thereto. The mixture was left to stand and aged at 23° C. for 24 hours to obtain a resorcinol/formaldehyde/latex mixed liquid.

Comparative Example 19

The curing and bonding were carried out in the same manner as in Example 2 except that the preparation of RFL was changed to the following method, and the bond strength was measured. The results are shown in Table 6. As is evident from Table 6, the coated state of RFL was uniform, but the peel strength was low.
Preparation of RFL
134 g of water was added to 244 g of NBR latex (Nipol (trademark) 1562 (solid content: 41%), manufactured by Nippon Zeon Co., Ltd.) as the latex component of RFL, and 264.3 g of the resorcinol/formaldehyde mixed liquid prepared as described in Example 2, was mixed thereto. The mixture was left to stand and aged at 23° C. for 24 hours to obtain a resorcinol/formaldehyde/latex mixed liquid.

Comparative Example 20

The curing and bonding were carried out in the same manner as in Example 2 except that the preparation of RFL was changed to the following method, and the bond strength was measured. The results are shown in Table 6. As is evident from Table 6, the coated state of RFL was uniform, but the peel strength was low.
Preparation of RFL
3.3 g of sodium lauryl sulfate (Emar 2F Needle (30% concentration), manufactured by Kao Corporation) was added as a surfactant to 244 g of NBR latex (Nipol (trademark) 1562 (solid content: 41%), manufactured by Nippon Zeon Co., Ltd.) as the latex component of RFL, and the mixture was thoroughly stirred until it became uniform. Then, 134 g of water was added thereto, and 264.3 g of the resorcinol/formaldehyde mixed liquid prepared as described in Example 2, was mixed thereto. The mixture was left to stand and aged at 23° C for 24 hours to obtain a resorcinol/formaldehyde/latex mixed liquid.

Comparative Example 21

The curing and bonding were carried out in the same manner as in Example 2 except that in the surface treatment of the polyester, no treatment with the ethyl acetate solution of isocyanate (Desmodule RE, manufactured by Bayer), was applied as the pretreatment, and the bond strength was measured (total amount of surfactant: 1.09 wt %). The results are shown in Table 6. As is evident from Table 6, the coated state of RFL was non-uniform, and the peel strength was low.

Comparative Example 22

The curing and bonding were carried out in the same manner as in Example 2 except that in the surface treatment of the polyester, no treatment with the ethyl acetate solution of isocyanate (Desmodule RE, manufactured by Bayer), was applied as the pretreatment, and the bond strength was measured (total amount of surfactant: 0.73 wt %). The results are shown in Table 6. As is evident from Table 6, the coated state of RFL was uniform, and the peel strength was low.

As is apparent from the foregoing description, by means of the treating agent for bonding a chlorosulfonated polyolefin compound and a polyester fiber, provided by the present invention, sufficient bond strength between the chlorosulfonated polyolefin compound and the treated polyester fiber can be obtained without a fluctuation by a single operation of simple treatment without necessity of repeating treatment with a resorcinol/formaldehyde/latex mixture. This will open up new application fields of e.g. various belts, various sheets and various hoses, such as belts for automobiles or belts for industrial purpose, which are used as reinforced by various fibers. Such products will provide excellent performance as new automobile parts or industrial parts.

What is claimed is:

1. A treated polyester fiber for reinforcing chlorosulfonated polyolefin, which consists of a polyester fiber coated with a treating agent comprising an isocyanate compound and/or an epoxy compound and with a treating agent which consists of a resorcinol/formaldehyde/latex mixture, wherein:
   1) the molar ratio of the resorcinol to the formaldehyde is from 1/0.1 to 1/5,
   2) the polymer component of the latex is a 2,3-dichlorobutadiene-containing polymer,
   3) the weight ratio of the solid content of the latex to the sum of the resorcinol and the formaldehyde is from 1/100 to 1/1,
   4) the amount of the 2,3-dichlorobutadiene-containing polymer solid content of the latex in the resorcinol/formaldehyde/latex mixture is from 5 to 50 wt %, and
   5) the amount of a surfactant in the resorcinol/formaldehyde/latex mixture is from 0.5 to 2.5 wt %.

2. A process for producing a treated polyester fiber for reinforcing chlorosulfonated polyolefin, which comprises treating a polyester fiber with a treating agent comprising an isocyanate compound and/or an epoxy compound and then with the treating agent as defined in claim 1.

3. An elastic body comprising the treated polyester fiber as defined in claim 1 and a chlorosulfonated polyolefin compound.

4. The elastic body according to claim 3, wherein the chlorosulfonated polyolefin is the one obtained by chlorinating and chlorosulfonating an ethylene homopolymer or an ethylene-α-olefin copolymer.

5. The elastic body according to claim 3, wherein the chlorosulfonated polyolefin is an ethylene-α-olefin copolymer, wherein the chlorine content is from 20 to 33 wt %, and the sulfur content is from 0.3 to 1.5 wt %.

6. A process for producing an elastic body, which comprises laminating and/or mixing a chlorosulfonated polyolefin compound and the treated polyester fiber as defined in claim 1, followed by curing for bonding.

7. A treated polyester fiber for reinforcing chlorosulfonated polyolefin, which consists of a polyester fiber coated with a treating agent comprising an isocyanate compound and/or an epoxy compound and with a treating agent, which consists of a surfactant/resorcinol/formaldehyde/latex mixture, wherein:
   1) the molar ratio of the resorcinol to the formaldehyde is from 1/0.1 to 1/5,
   2) the polymer component of the latex is a 2,3-dichlorobutadiene-containing polymer,
   3) the weight ratio of the solid content of the latex to the sum of the resorcinol and the formaldehyde is from 1/100 to 1/1,
   4) the amount of the 2,3-dichlorobutadiene-containing polymer solid content of the latex in the resorcinol/formaldehyde/latex mixture is from 5 to 50 wt %, and
   5) the amount of the surfactant in the resorcinol/formaldehyde/latex mixture is from 0.5 to 2.5 wt %,
   and the surfactant is at least one member selected from the group consisting of the following (a) anionic surfactants and (b) nonionic surfactants:
   (a) at least one anionic surfactant selected from the group consisting of a rosin soap, a disproportionated rosin soap, an alkyl sulfate, an alkyl benzene sulfonate, an alkyl naphthalene sulfonate, a dialkyl sulfosuccinate, a polyoxyethylene alkyl ether sulfate and a formalin condensation product of an alkyl aryl sulfonate, and
   (b) at least one nonionic surfactant selected from the group consisting of a polyoxyethylene alkyl ether, a polyoxyethylene higher alcohol ether and a polyoxyethylene alkylphenyl ether.

8. A process for producing a treated polyester fiber for reinforcing chlorosulfonated polyolefin, which comprises treating a polyester fiber with a treating agent comprising an isocyanate compound and/or an epoxy compound and then with the treating agent as defined in claim 7.

9. An elastic body comprising the treated polyester fiber as defined in claim 7 and a chlorosulfonated polyolefin compound.

10. The elastic body according to claim 9, wherein the chlorosulfonated polyolefin is the one obtained by chlorinating and chlorosulfonating an ethylene homopolymer or an ethylene-α-olefin copolymer.

11. The elastic body according to claim 9, wherein the chlorosulfonated polyolefin is an ethylene-α-olefin copolymer, wherein the chlorine content is from 20 to 33 wt %, and the sulfur content is from 0.3 to 1.5 wt %.

12. A process for producing an elastic body, which comprises laminating and/or mixing a chlorosulfonated polyolefin compound and the treated polyester fiber as defined in claim 7, followed by curing for bonding.

* * * * *